United States Patent [19]

Kimura et al.

[11] Patent Number: 4,704,695
[45] Date of Patent: Nov. 3, 1987

[54] INFERENCE SYSTEM

[75] Inventors: Kazuhiro Kimura, Yokohama; Katsuyo Ishida, Tokyo, both of Japan

[73] Assignee: Kabushiki Kaisha Toshiba, Kawasaki, Japan

[21] Appl. No.: 733,721

[22] Filed: May 14, 1985

[30] Foreign Application Priority Data

Jun. 26, 1984 [JP] Japan .................. 59-130104

[51] Int. Cl.⁴ .................. G06F 15/18; G06K 9/66
[52] U.S. Cl. .................. 364/513; 364/300; 364/900; 382/15
[58] Field of Search ... 364/513, 148, 194, 200 MS File, 364/900 MS File, 513.5, 300; 382/14, 15

[56] References Cited

U.S. PATENT DOCUMENTS

| | | | |
|---|---|---|---|
| 3,596,258 | 7/1971 | Choate et al. | 364/900 |
| 3,716,840 | 2/1973 | Masten et al. | 364/200 |
| 3,725,875 | 4/1973 | Choate et al. | 364/200 |
| 3,950,733 | 4/1976 | Cooper et al. | 364/194 X |
| 4,254,474 | 3/1981 | Cooper et al. | 364/900 |
| 4,479,241 | 10/1984 | Buckley | 382/15 |

Primary Examiner—Joseph Ruggiero
Attorney, Agent, or Firm—Schwartz, Jeffery, Schwaab, Mack, Blumenthal & Evans

[57] ABSTRACT

In an inference system in accordance with the present invention, an attributive information is supplemented to a knowledge unit for the purpose of smooth execution of inference, and a knowledge base is constructed with this pair as the building unit. In connection with this, functions that are in response to the purpose, such as selection or rejection of a knowledge unit and alteration in the order of search, are added to the inference organ, based on the attributive information. Employed as an attributive information is, for example, the information on the frequency of use of each knowledge unit. The inference organ renews the information on the frequency of use for every use of each knowledge unit. In addition, a housing space is allocated to each knowledge unit based on the information on the frequency of use. This means, for example, that a knowledge unit with higher frequency of use is housed in an area of the inference organ such as core memory that may be accessed with ease.

8 Claims, 8 Drawing Figures

FIG. 3

| ATTRIBUTIVE INFORMATION 1 | KNOWLEDGE UNIT 1 |
| ATTRIBUTIVE INFORMATION 2 | KNOWLEDGE UNIT 2 |
| ⋮ | ⋮ |
| ATTRIBUTIVE INFORMATION n | KNOWLEDGE UNIT n |

| FREQUENCY OF USE INFORMATION | TYPE INFORMATION | FIELD OF USE INFORMATION | USER INFORMATION | RESERVE |

FIG. 5

| 50 | 52 | 54 |
|---|---|---|
| FREQUENCY OF USE INFORMATION 1 | TYPE INFORMATION 1 | KNOWLEDGE PROPER 1 |
| FREQUENCY OF USE INFORMATION 2 | TYPE INFORMATION 2 | KNOWLEDGE PROPER 2 |
| ⋮ | ⋮ | ⋮ |

~301, ~302, ~303

INFERENCE SYSTEM

BACKGROUND OF THE INVENTION

1. Field of the Invention

The present invention relates to an inference system which adopts knowledge engineering techniques such as production rule or frame, more particularly to a method and apparatus for inference which is capable of effectively searching a huge amount of knowledge information.

2. Description of the Prior Art

Various kinds of diagnosing and guidance systems with capabilities that rival those of the experts in the field have been manufactured in recent years by the use of an inference system that employs knowledge engineering techniques. As an example of such a system one may mention the medical diagnosing system which displays automatically the name of the corresponding disease, the diagnosing method, and the like, upon inputting through the terminal of the current symptoms by the doctor. The part which corresponds to the "human knowledge" (this will be referred to as the knowledge base) that is to be used in these systems as the data base is described in a form such as a production rule or a frame, to be managed separately and independent from the flow of controls for the entire system. By arranging the knowledge base to be independent in this manner, one inference system may be made operative in a variety of applied systems by a simple exchange of the knowledge base. Here, a knowledge base is composed of numerous units called knowledge units. A knowledge base is the so-called individual knowledge information, and the form for accumulating it in a system is the production rule, the frame, or the like.

What is meant by the production rule is the "If . . . , then . . . " rule, for example, such knowledge as "If it is a bird, then it flies." or "If it is a sparrow, then it is a bird." In this case, when a question "Does a sparrow fly?" is asked, an answer "A sparrow flies." will be inferred from the above two production rules by syllogism.

In addition, a frame is what represents a knowledge declaratively in terms of a superior frame and an inferior frame. For example, in the superior frame of an index word "a girl," there may be housed knowledges "human being," "height," and "weight=-(height−100)×0.9," while in the inferior frame of an index word "Hanako," knowledges "a girl" and "a height of 170 cm" may be housed. Then, if a question "What is the weight of Hanako?" is input by the user, then the knowledge on the "weight" in the superior frame is called out to infer an answer of "63". Therefore, in developing an inference system, building up of useful knowledge bases (knowledge units) will play a key role which corresponds to the conventional work of preparing a program. In other words, the usefulness of an inference system may be considered to depend on the quality and quantity of its knowledge bases. However, in these systems, as the quantity of the accumulated knowledge bases increases, the execution speed (inference speed) of the system as a whole is decreased necessarily. This is due to the fact that a search by the inference system of the knowledge units is carried out by the use of the pattern matching of the arrays of symbols. However, the use of a huge amount of knowledge was inevitable for the construction of a useful inference system so that its tradeoffs with the execution speed has been a matter of concern.

SUMMARY OF THE INVENTION

An object of the present invention is to provide an inference method which is capable of searching effectively a huge amount of knowledge information.

Another object of the present invention is to provide an inference method which is capable of extracting knowledge that is necessary and sufficient for carrying out a search and an inference of an intended knowledge, out of a large scale knowledge base.

Still another object of the present invention is to provide an inference system which is capable of searching, effectively and fast, a huge amount of knowledge information.

Briefly described, these and other objects of the present invention are accomplished by the provision of an improved inference system which includes an input section for inputting an inference indication signal, a knowledge accumulation section for accumulating numerous knowledge units together with the corresponding attributive information, a work domain section for temporarily housing the knowledge units, a housing means for selecting a part of the knowledge units that are accumulated in the knowledge accumulation section, in accordance with the attributive information corresponding to the knowledge units, and for housing temporarily the selected knowledge units in the work domain section, and an inference processing means for selecting the knowledge units, based on the inference indication signal, out of the knowledge units that are housed in the work domain section by the housing means, and for carrying out an inference by the use of the knowledge units thus selected.

BRIEF DESCRIPTION OF THE DRAWING

These and other objects, features and advantages of the present invention will be more apparent from the following description of a preferred embodiment, taken in conjunction with the accompanying drawings, in which:

FIG. 3 is an internal block diagram of the knowledge accumulation section shown in FIG. 1;

FIG. 4 is an example of the attributive information which is used for an inference system in accordance with the present invention;

FIG. 5 is an internal block diagram of the work domain section shown in FIG. 1.

DESCRIPTION OF THE PREFERRED EMBODIMENTS

Referring to FIGS. 1 to 6, there is shown an example of constructing an inference system which permits an efficient search of the knowledge units by attaching the information on the frequency of use to each knowledge unit and by determining the allocation of the housing place for each knowledge unit based on the information on the frequency of use.

Figure 1:
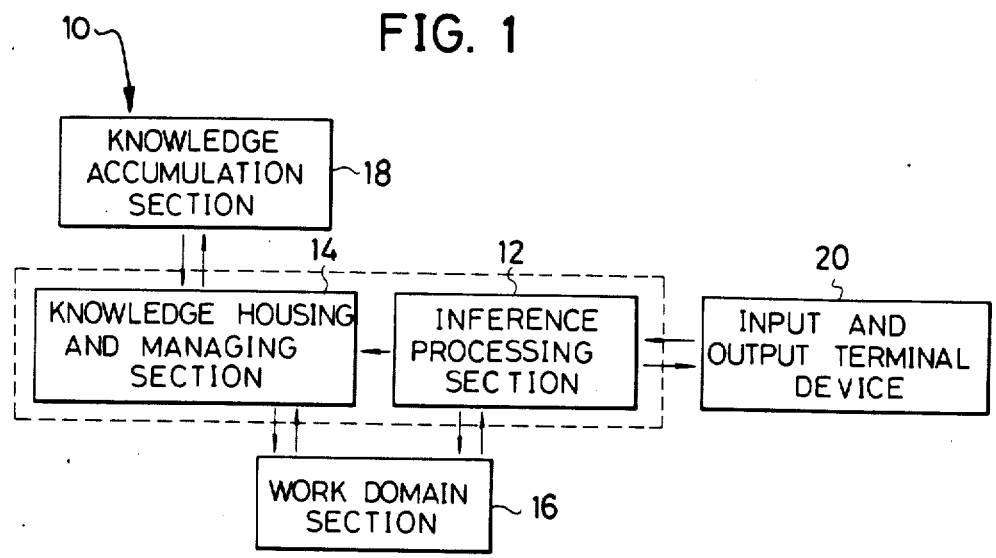
FIG. 1 is an overall block diagram of an inference system embodying the present invention.

As shown in FIG. 1, an inference device 10 embodying the present invention includes an inference processing section 12, a knowledge housing and managing section 14, a work domain section 16, and a knowledge accumulation section 18.

In response to a request from a user, the inference processing section 12 which forms the nucleus of the inference organ executes a search for the knowledge units that are being housed in the work domain section 16 and an inference based on the outcome of the search, and reports the result of the inference to the user. The knowledge housing and managing section 14 which operates on an indication from the inference processing section 12, executes the processing for expanding the knowledge units that are accumulated in the knowledge accumulation section 18 in the form of the work domain section 16 and for transferring the result to the work domain section 16. It carries out also the processing for accumulating the knowledge that is housed in the work domain section 16 to the knowledge accumulation section 18. (The details of these processings will be described later.)

The work domain section 16 is the section for housing the knowledge units to be used for the inference processing. It houses each knowledge unit at the housing space based on its attributive information. The knowledge accumulation section 18 which is the section for accumulating and keeping all the knowledge units that are used by the inference organ constitutes the knowledge base, based on the inference method in accordance with the present invention. An input and output terminal 20 is the interface with the user, and executes the processing of supplying the request and knowledge that are input by the user to the inference organ, and the processing of informing the output result from the inference organ to the user.

Figure 2:
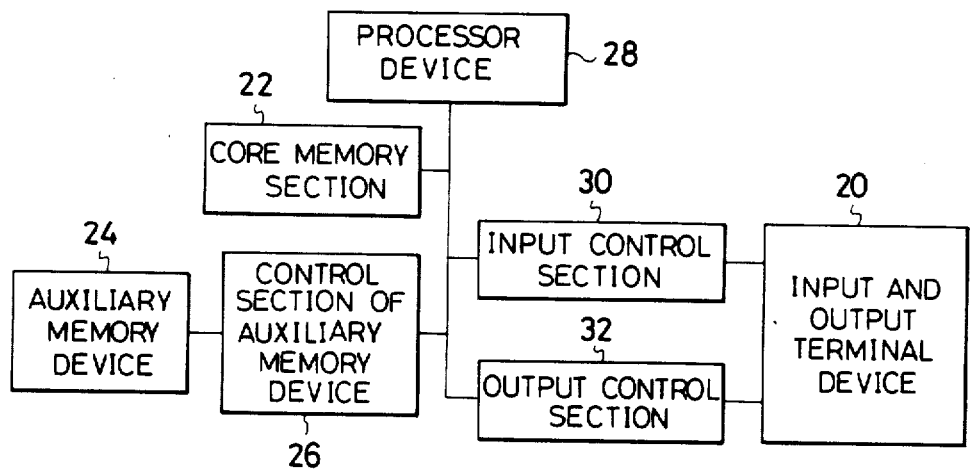
FIG. 2 is a concrete block diagram of the inference system shown in FIG. 1.

In FIG. 2 is shown a concrete internal block diagram that corresponds to the overall block diagram shown by FIG. 1. In FIG. 2, the core memory section 22 houses the programs for processing and control procedures for the inference processing section 12 and the knowledge housing and managing section 14. In addition, it also houses a part of the knowledges in the work domain section 16. An auxiliary memory device 24 which is composed of a disc apparatus or the like houses the knowledges in the knowledge accumulation section 18. Moreover, it also houses a part of the knowledges in the work domain section 16. (These will be described in detail later.) A control section of the auxiliary memory device 26 executes the control of the auxiliary memory device 24 under the indication from the processor device 28. An input control section 30 and an output control section 32 that act as the interfaces with the input and output terminal device 20 that consists of a keyboard device, a display device, an audio input and output device, and others. The processor device 28 carries out an overall control of these inference systems.

Next, the internal construction of the knowledge accumulation section 18 and the work domain section 16 of the present invention will be described. In FIG. 3 is shown the internal construction of the knowledge accumulation section 18. According to the construction system of the knowledge base for the present invention mentioned earlier, a knowledge consists of a pair of descriptions about a knowledge unit 40 which represents the main body of the knowledge and about an attributive information 42 on the knowledge. The knowledge unit 40 is housed in accordance with a production rule or a frame mentioned in the foregoing. In the attributive information 42 is housed an information for managing the knowledge, as shown by FIG. 4. The information on the frequency of use is an information which shows how many times the knowledge in question has been used. The information on the type shows to which of the types, such as the inference rule, fact, goal, and others, the knowledge belongs. The information on the field and the object of use shows in what kind of field or in what kind of phase of an inference the knowledge in question is used. The information on the user shows by what kind of user the knowledge is used. In addition, various attributive information is appended to the reserve section as need arises.

A knowledge in the knowledge accumulation section 18 with such a construction is expanded (that is, is transformed to a language which is easy to handle by the machine) in the work domain section 16 by the knowledge housing and managaing section 14. FIG. 5 shows an example of expansion for the present embodiment. Here, the information on the frequency of use 50 and the information on the type 52 alone, are expanded as the attributive information. Further, each knowledge unit is expanded in conformity with the system used by the inference processing section 12, which forms a knowledge proper. (These will be described later.) The work domain section 16 is subdivided into a work domain A (301), a work domain B(302), and a work domain C (303). Although each domain is expanded in logically identical form, the division is introduced in order to contribute to an improvement of the execution efficiency of the inference organ. Expanded in the work domains A(301) and C(303) are the knowledge in the knowledge accumulation section 18. Here, the work domains A and C are allocated to the domains with fast and slow accesses, respectively. In concrete terms, in FIG. 2, the domain A corresponds to the core memory section 22 and the domain C corresponds to the auxiliary memory device 24. Furthermore, housed in the work domain B is a knowledge which is derived in the process of inference at the inference processing section 12 or a knowledge which is input by the user. Such a knowledge is allocated to the domain of fast access. The work domain B corresponds also to the core memory section 22 of FIG. 2.

Figure 6A:
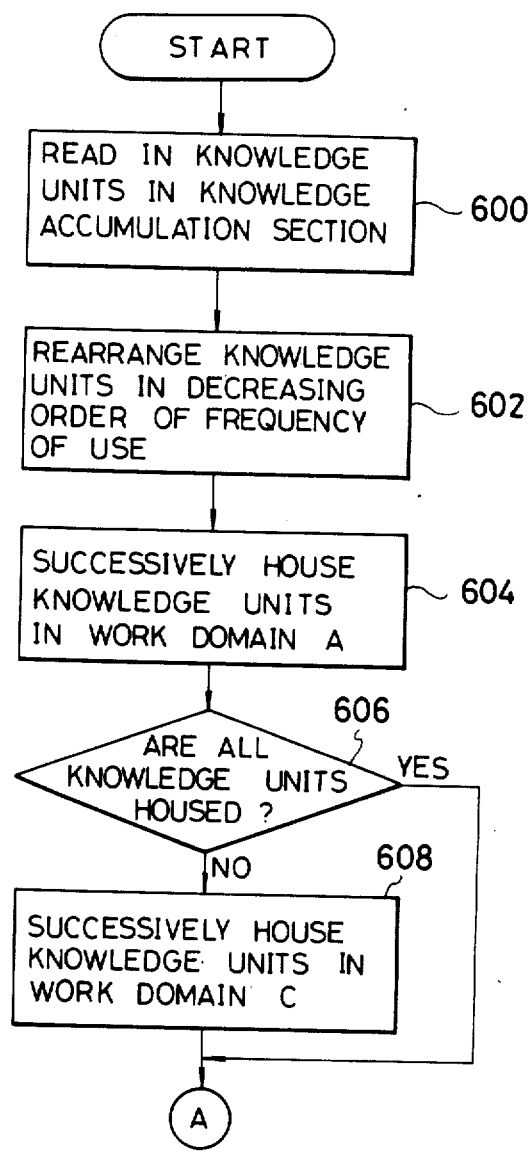
FIGS. 6a, 6b and 6c show charts for a control program which is realizing the inference method due to the present invention.
Figure 6B:
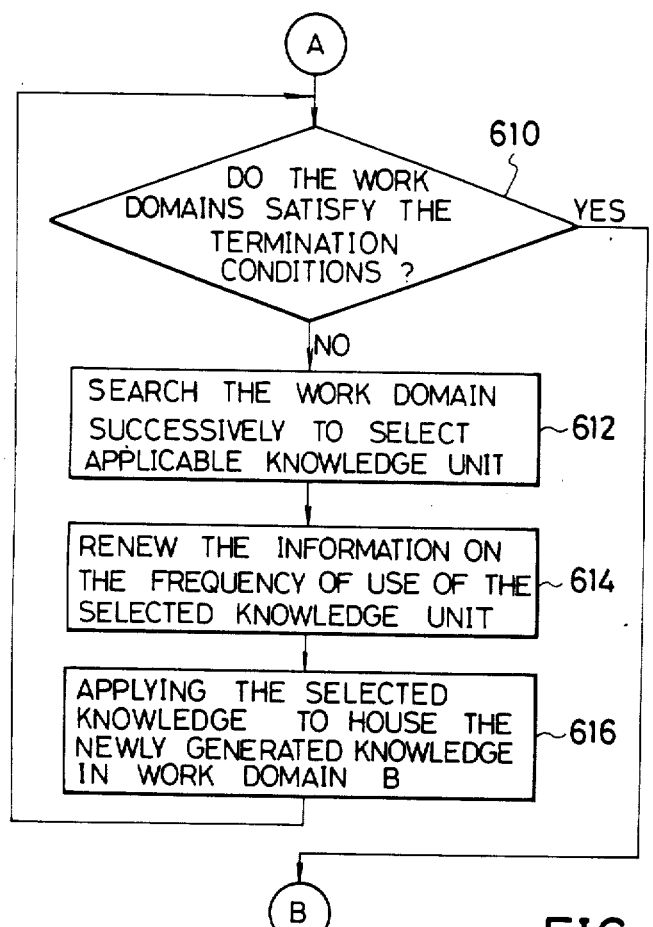
Figure 6C:
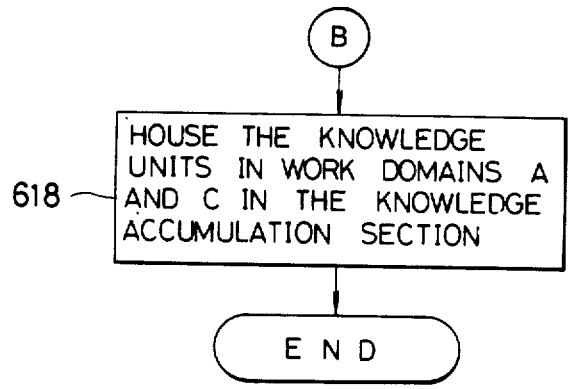

Next, the operation of the present embodiment will be described by referring to FIG. 6. FIG. 6 shows the flow charts of the control procedures for the inference organ of the present invention. The flow of the entire controls proceeds in the order (a)→(b)→(c) of FIG. 6. Here, (a) and (c) represent the control procedures for the knowledge housing and managing section 14, while (b) is the control procedure for the inference processing section 12. By of inputting of an inference indication signal (problem presentation) through the input and output terminal device 20 of FIG. 1 by the user, the inference organ starts its operation. First, by an indication from the inference processing section 12 of FIG. 1, the knowledge housing and managing section 14 reads in knowledge units and a corresponding attributive information obtained from the knowledge accumulation section 18 (step 600). Next, the knowledge housing and managaing section 12 rearranges the knowledge units that were read in the decreasing order of the corresponding frequency of use (step 602). (It should be mentioned that in the following description of the operation of the present embodiment, it will be assumed that the information on the frequency of use alone will be used as the attributive information.) The reordered knowledge units are housed successively in this order in the work domain A (301) of the work domain section 16 (step 604). (As was mentioned in the above, the knowledge units here are housed successively as knowledge proper, transformed to a language that is easy for the machine to process.) When all of the knowledge units are housed in the work domain A (step 606), the knowledge housing and managing section 14 concludes the operation. If it is not possible to house all of the knowledge units in the work domain A, the units are consecutively housed successively in the work domain C (step 608). In this way, the knowledge units (knowledges proper) that have been accumulated in the knowledge accumulation section 18 are housed in the decreasing order of frequency of use in the work domains A and C of the work domain section 16. Next, the inference processing section 12 searches the domain A in the decreasing order of frequency of use to see whether the answer to the presented problem, input by the user, already exists among those housed in the work domains A and C(step 610). When the answer itself is found already housed there (this will be referred to as the work domain satisfies the termination conditions), the answer is displayed to the user through the input and output terminal device 20. When the answer itself is not housed there, it executes an inference processing. In other words, the inference processing section 12 searches the knowledge units in the work domain A in the decreasing order of frequency of use to select knowledge units that are applicable to the inference (step 612). Also, the information on the frequency of use corresponding to the selected knowledge units are renewed (step 614). Namely, the inference processing section 12 executes an inference by using the selected units to obtain the answer to the problem presented by the user. The knowledge newly generated in the inference processing is housed in the work domain B (step 616). Explaining concretely the operation of FIG. 6(b), when a problem presented by the user, "Does a sparrow fly?," is input, the inference processing section 12 displays the answer "A sparrow flies." if it exists as is in the work domain. If there does not exist such an answer, the knowledge units "A bird flies." and "A sparrow is a bird." are selectd from the work domain to infer (by syllogism) an answer "A sparrow flies." Upon completion of inference in this manner, the knowledge housing and managing section 14 houses again, under an indication from the inference processing section 12, the knowledge units in the work domains A and C and their attributive information (this includes the renewed information on the frequency of use) in the knowledge accumulation section 18 (step 618). (The knowledges that are newly generated in the inference process are housed in the work domain B, but they are cleared after completion of inference since they are different from the basic knowledges that are needed in carrying out the inference.) This completes the operation of the present embodiment.

As described in the foregoing, according to the present invention, it becomes possible through discrimination of knowledges by the use of the information on the frequency of use to house more frequently used knowledges in the region of faster access (core memory section) to allow an effective search of a huge amount of knowledges. Viewed from the fact that the usefulness of an inference system as a whole is determined by the amount of the knowledges held in the system, this means that the present invention plays a key role in an inference system.

It should be noted that the present invention is not limited to these embodiments described in this disclosure. By making an active use of other attributive information accumulated in the knowledge accumulation section 18 of the present invention, it is possible to classify and distinguish knowledges from different viewpoint. For example, the information on the field and purpose of use shown in FIG. 4 becomes a key to a fast extraction of necessary and sufficient knowledges for execution of search and inference of the knowledge in question from among a large scale knowledge base. In addition, the user information may be utilized for discerning an intrinsic knowledge which is to be used by a specific user, and is useful in building up an individual knowledge base appropriate for the user. Moreover, as shown in FIG. 5, it is possible to select a knowledge unit by combining the frequency of use information and the type information. The attributive information is applicable to a variety of cases, as explained in the above, and it is needless to say that those systems to which is applied the attributive information for the purpose of control, maintenance, construction, and so forth of the knowledge base, fall within the scope of the present invention.

Various modifications will become possible for those skilled in the art after receiving the teachings of the present disclosure without departing from the scope thereof.

What is claimed is:

1. A method of inferring a suitable answer to an interrogation utilizing a plurality of knowledge units in accordance with corresponding attributive information, which comprises the steps of:
   (a) accessing the knowledge units and corresponding attributive information from knowledge accumulation means, said corresponding attributive information including frequency-of-use information;
   (b) rearranging the accessed knowledge units and corresponding attributive information into a frequency-of-use order based on the frequency-of-use information;
   (c) storing the rearranged knowledge units and corresponding attributive information in work domains of a memory;
   (d) searching the knowledge units stored in step (c) in accordance with the frequency-of-use information successively from knowledge units having a greater frequency-of-use to knowledge units having a lesser frequency-of-use;
   (e) selecting the suitable answer based on one of
      (1) knowledge units stored in the work domains, and
      (2) knowledge units generated by inference of syllogism;
   (f) updating the frequency-of-use information of the selected knowledge units.

2. The method as claimed in claim 1, wherein said frequency-of-use order is from the knowledge units having the greater frequency-of-use to the knowledge units having the lesser frequency-of-use.

3. The method as claimed in claim 1, further including the step of comparing frequency-of-use information of the knowledge units with each other so that the knowledge units are rearranged in decreasing order from greatest frequency-of-use to lesser frequency-of-use.

4. The method as claimed in claim 1, wherein the knowledge units having greater frequency-of-use are stored in a storage zone of one work domain capable of faster access than a storage zone of another work domain which stores the knowledge units having lesser frequency-of-use.

5. An inference system for inferring a suitable answer to an interrogation utilizing a plurality of knowledge units in accordance with corresponding attributive information, comprising:
   (a) input means for inputting an inference instruction signal;
   (b) knowledge accumulation means for accumulating the plurality of knowledge units together with their corresponding attributive information, said corresponding attributive information including frequency-of-use information;
   (c) work domains for temporarily storing the knowledge units and their corresponding attributive information in accordance with the frequency-of-use information;
   (d) knowledge housing and managing means for reading the knowledge units and corresponding attributive information from the knowledge accumulation means, for rearranging the knowledge units and corresponding attributive information into a frequency-of-use order based on the frequency-of-use information, and for storing the knowledge units and corresponding attributive information in said work domains successively in accordance with the frequency-of-use order;
   (e) inference processing means for selecting the suitable answer based on one of
      (2) knowledge units stored in said work domains, and
      (2) knowledge units generated by inference of syllogism based on the inference instruction signal; and
   (f) output means for displaying the selected knowledge units.

6. The inference system as claimed in claim 5, wherein each corresponding attributive information includes category information, such as an inference rule, fact, and goal or target, an object, a field of use, and users.

7. The inference system as claimed in claim 6, wherein said knowledge housing and managing means updates the frequency-of-use information of the selected knowledge units.

8. The inference system as claimed in claim 6, wherein said work domains comprise:
   at least one storage zone of one work domain for storing knowledge units having a greater frequency-of-use,
   at least one storage zone of another work domain for storing knowledge units having a lesser frequency-of-use.
   wherein said at least one storage zone of said one work domain has a faster access than said at least one storage zone of said another work domain.

* * * * *